US012769366B2

(12) United States Patent
Fu

(10) Patent No.: US 12,769,366 B2
(45) Date of Patent: Oct. 20, 2026

(54) ELECTRONIC DEVICE

(71) Applicant: VIVO MOBILE COMMUNICATION CO., LTD., Guangdong (CN)

(72) Inventor: Conghua Fu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 165 days.

(21) Appl. No.: 18/441,010

(22) Filed: Feb. 14, 2024

(65) Prior Publication Data

US 2024/0184333 A1 Jun. 6, 2024

Related U.S. Application Data

(63) Continuation of application No. PCT/CN2022/114707, filed on Aug. 25, 2022.

(30) Foreign Application Priority Data

Aug. 30, 2021 (CN) ........................ 202111000694.5

(51) Int. Cl.
*G06F 1/16* (2006.01)
*G06V 40/13* (2022.01)

(52) U.S. Cl.
CPC .......... *G06F 1/1643* (2013.01); *G06F 1/1616* (2013.01); *G06F 1/1656* (2013.01); *G06V 40/1306* (2022.01)

(58) Field of Classification Search
CPC .... G06F 1/1652; G06F 1/1641; G06F 1/1616; G06F 1/1643; H04M 1/026; G06V 40/1306
USPC .......................................................... 367/180
See application file for complete search history.

(56) References Cited

U.S. PATENT DOCUMENTS

| | | | | |
|---|---|---|---|---|
| 10,036,734 B2 * | 7/2018 | Fennell | .................. | H10N 30/03 |
| 2014/0035881 A1 * | 2/2014 | Esteve | .................. | G06F 3/0436<br>345/177 |
| 2018/0373913 A1 * | 12/2018 | Panchawagh | .......... | H10K 59/00 |
| 2020/0057525 A1 * | 2/2020 | Prest | ...................... | H04R 1/028 |

(Continued)

FOREIGN PATENT DOCUMENTS

| | | | | |
|---|---|---|---|---|
| CN | 109492501 A * | 3/2019 | ......... | G06V 40/1306 |
| CN | 210324234 U | 4/2020 | | |
| CN | 111967417 A | 11/2020 | | |

(Continued)

OTHER PUBLICATIONS

CN-109492501-A (machine translation) (Year: 2019).*

(Continued)

*Primary Examiner* — Yuqing Xiao
*Assistant Examiner* — Christopher Richard Walker
(74) *Attorney, Agent, or Firm* — BROOKS KUSHMAN P.C.

(57) ABSTRACT

An electronic device. The electronic device includes: a frame; a foldable screen, disposed above the frame; an ultrasonic transducer, disposed between the frame and the foldable screen, and configured to transmit and receive ultrasonic waves; and a reflective support member, disposed between the ultrasonic transducer and the frame, and configured to support the ultrasonic transducer, where at least some of ultrasonic waves emitted toward the frame are completely reflected by the reflective support member and then are emitted toward the foldable screen.

5 Claims, 10 Drawing Sheets

(56) References Cited

U.S. PATENT DOCUMENTS

2021/0004558 A1 1/2021 Zeng et al.

FOREIGN PATENT DOCUMENTS

CN 112466205 A 3/2021
CN 113672042 A 11/2021

OTHER PUBLICATIONS

Extended European Search Report for Application No. 22863288.1, dated Oct. 30, 2024, 9 Pages.
International Search Report and Written Opinion for Application No. PCT /CN2022/114707, dated Oct. 8, 2022, 7 Pages.

* cited by examiner

ELECTRONIC DEVICE

CROSS-REFERENCE TO RELATED APPLICATIONS

This application is a continuation of International Application No. PCT/CN2022/114707 filed on Aug. 25, 2022, which claims priority to Chinese Patent Application No. 202111000694.5 filed on Aug. 30, 2021, which are incorporated herein by reference in their entireties.

TECHNICAL FIELD

This application relates to the field of electronic device technologies, and in particular, to an electronic device.

BACKGROUND

Currently, an under-display ultrasonic fingerprint identification technology cannot be applied to an electronic device with a foldable screen. A specific reason is as follows: When the ultrasonic fingerprint identification technology is used, an ultrasonic transducer needs to be directly attached to a back surface of the foldable screen, but the foldable screen is soft and prone to deformation, and cannot provide enough mechanical protection for the ultrasonic transducer. In addition, a user presses the foldable screen and the ultrasonic transducer for unlocking, and the ultrasonic transducer may be damaged due to large deformation.

SUMMARY

Embodiments of this application provide an electronic device, including: a frame; a foldable screen, disposed above the frame; an ultrasonic transducer, disposed between the frame and the foldable screen, and configured to transmit and receive ultrasonic waves; and a reflective support member, disposed between the ultrasonic transducer and the frame, and configured to support the ultrasonic transducer, where at least some of ultrasonic waves emitted toward the frame are completely reflected by the reflective support member and then are emitted toward the foldable screen.

A part of additional aspects and advantages of this application is provided in the following descriptions, and the part will become apparent from the following descriptions, or may be learned from practice of this application.

BRIEF DESCRIPTION OF THE DRAWINGS

The foregoing and/or additional aspects and advantages of this application will become apparent and readily understood from the descriptions of embodiments with reference to the following accompanying drawings.

Figure 1:
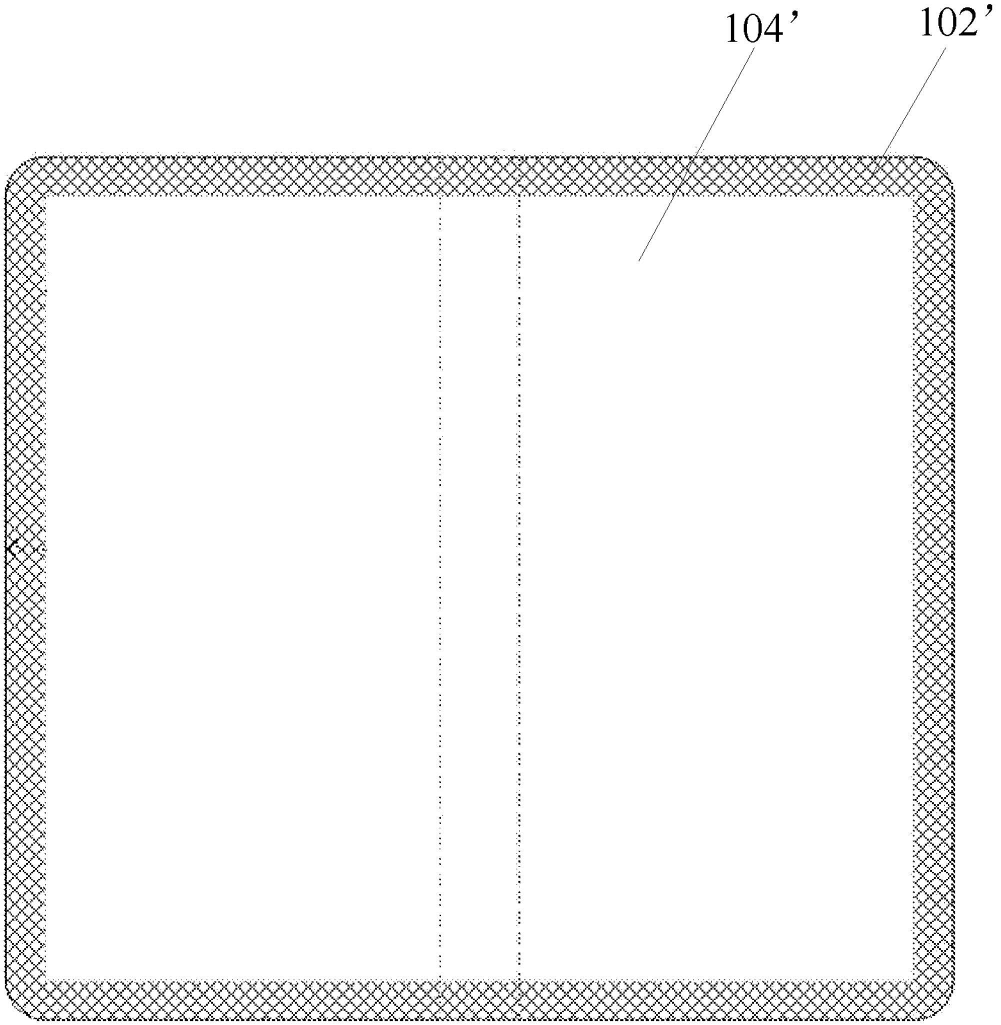
FIG. 1 is a first schematic diagram of a structure of an electronic device in a related technology.
Figure 2:
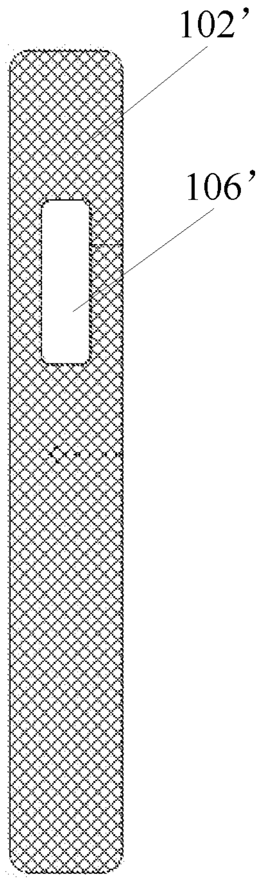
FIG. 2 is a side view of the electronic device shown in FIG. 1.
Figure 3:
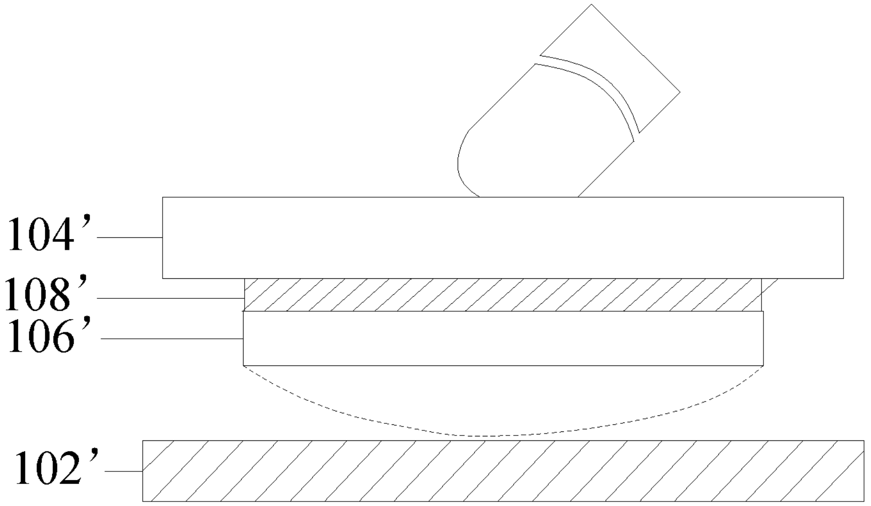
FIG. 3 is a second schematic diagram of a structure of an electronic device in a related technology.

Reference numerals in FIG. 1 to FIG. 3:

102': Frame; 104': Foldable screen; 106': Ultrasonic transducer; 108': Metal support mesh.

Figure 4:
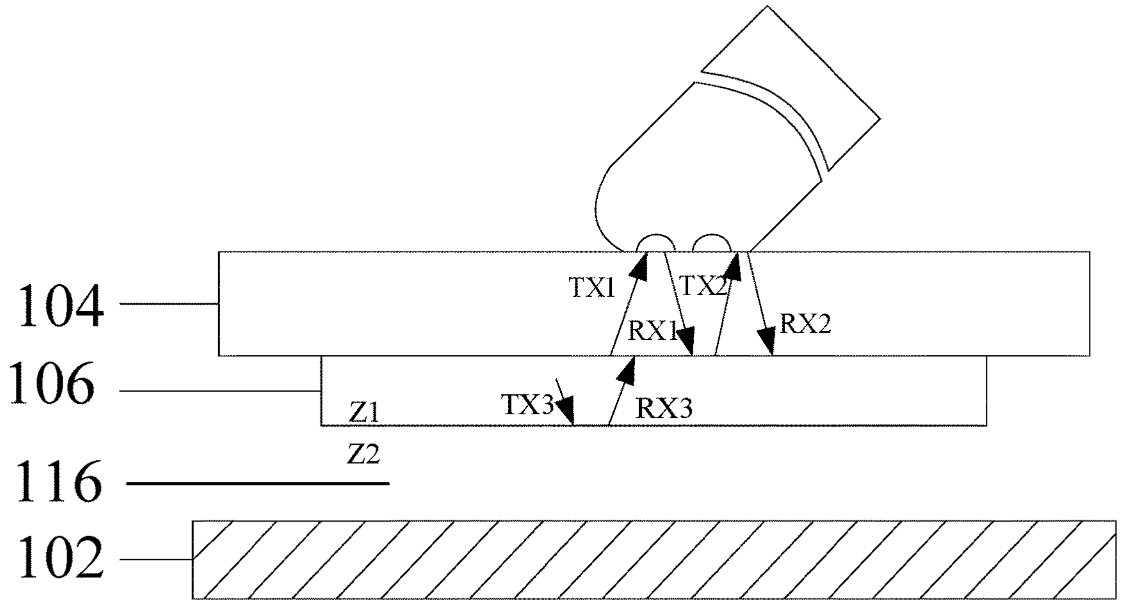
Figure 5:
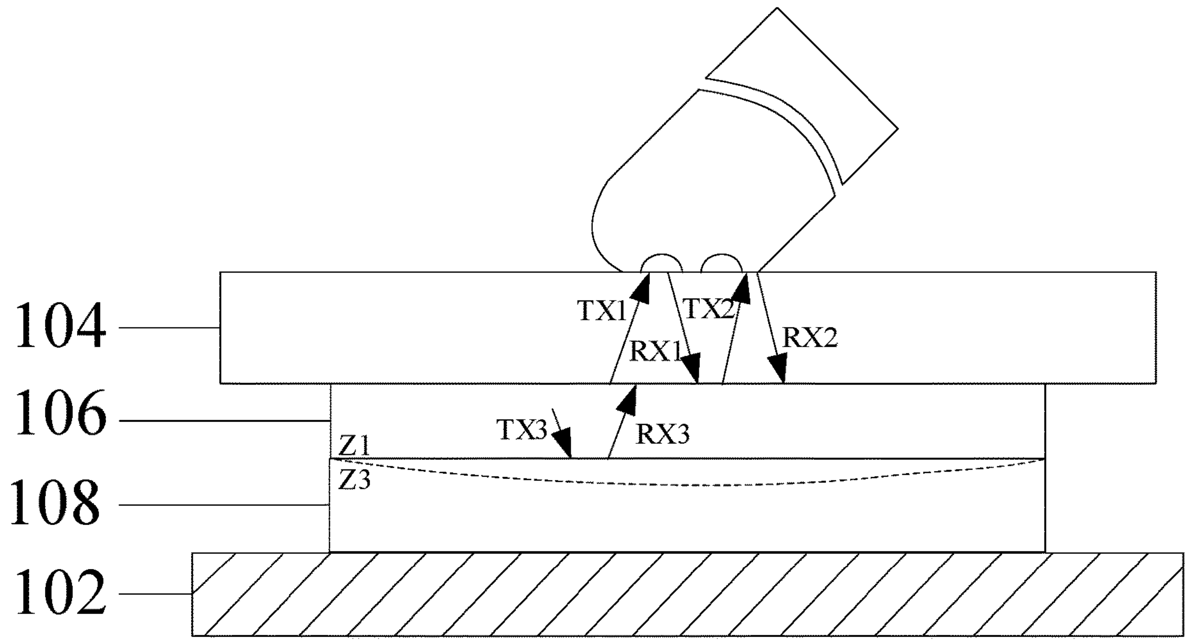
Figure 6:
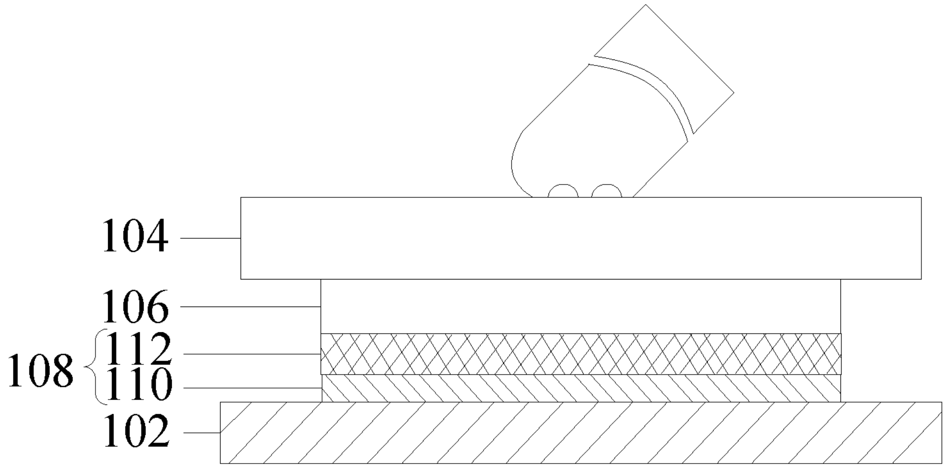
Figure 7:
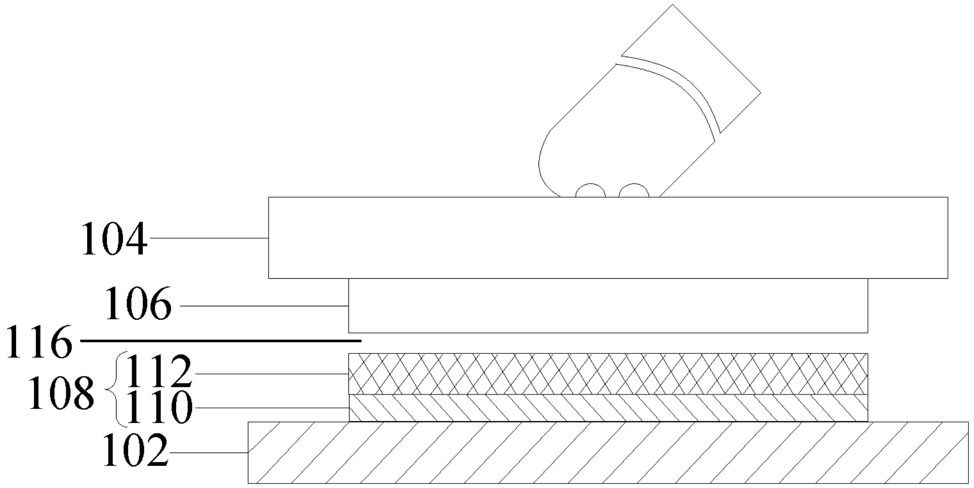
Figure 8:
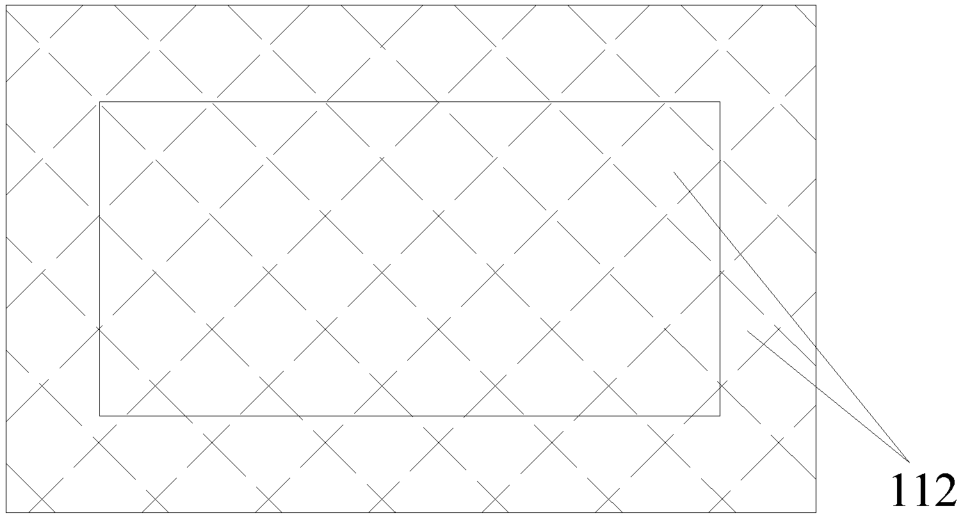
Figure 9:
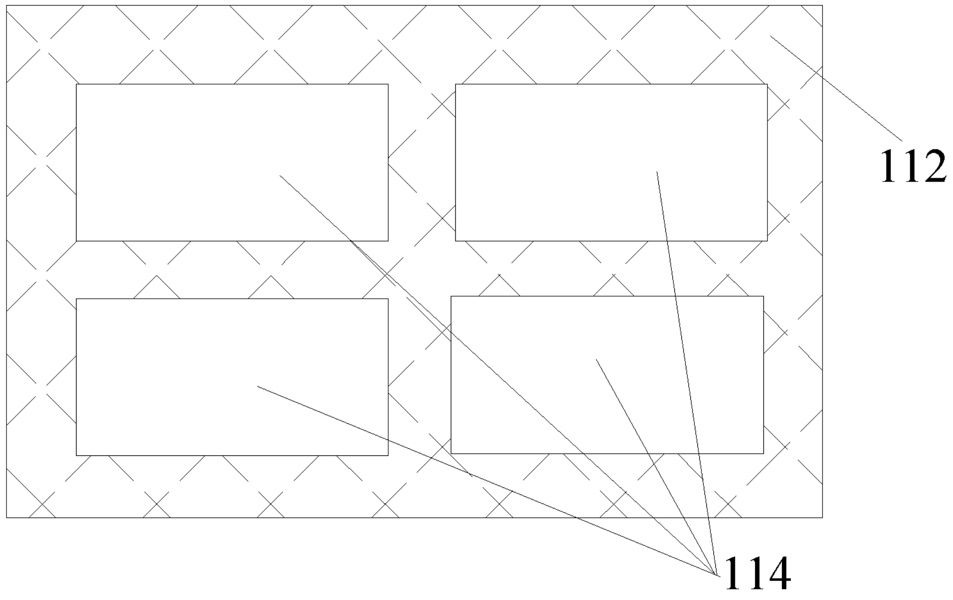
Figure 10:
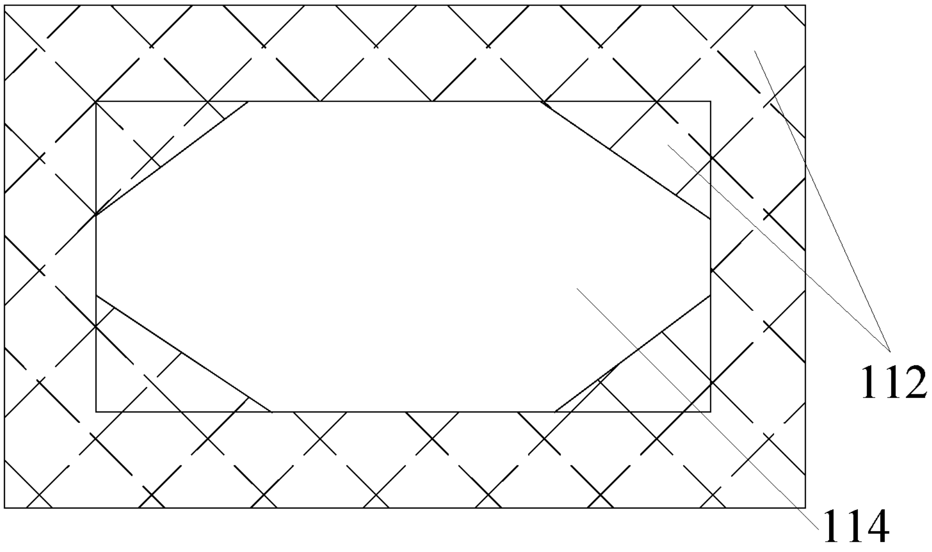
Figure 11:
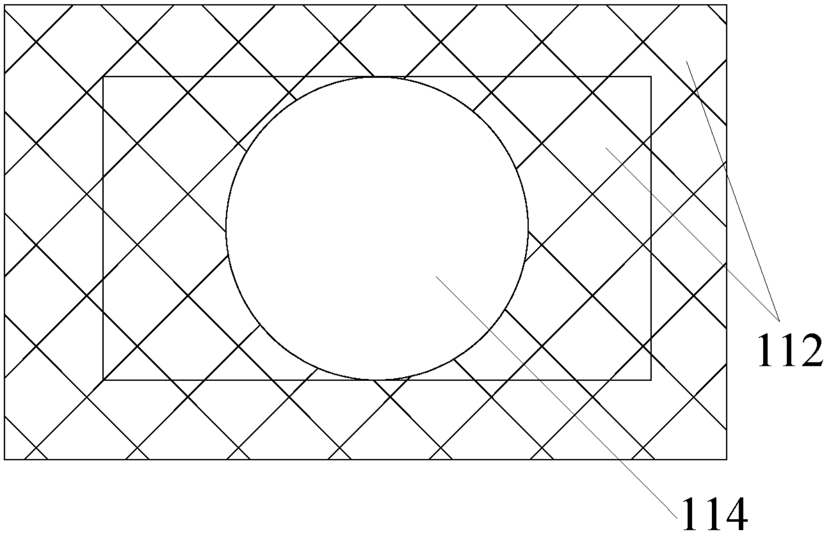
Figure 12:
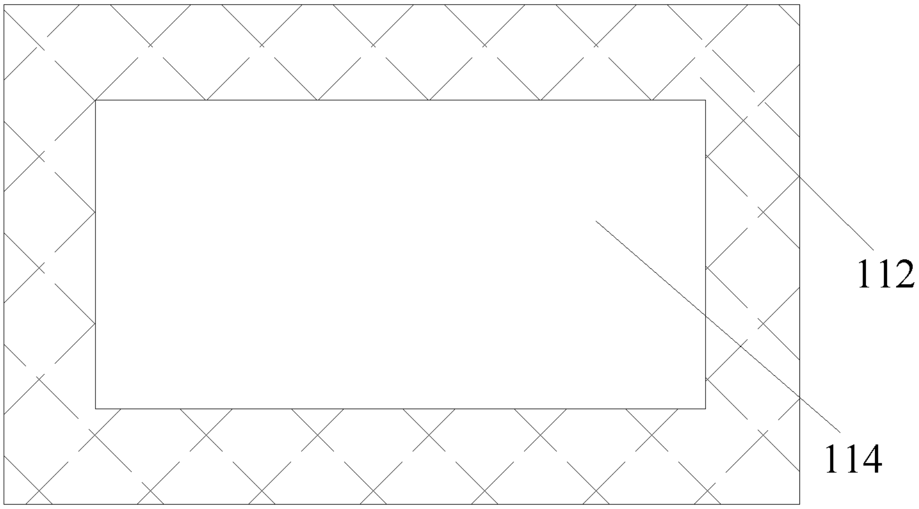
Figure 13:
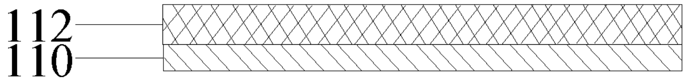
Figure 14:
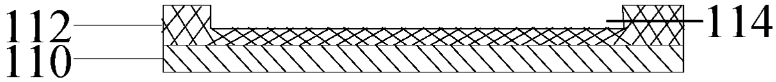
Figure 15:
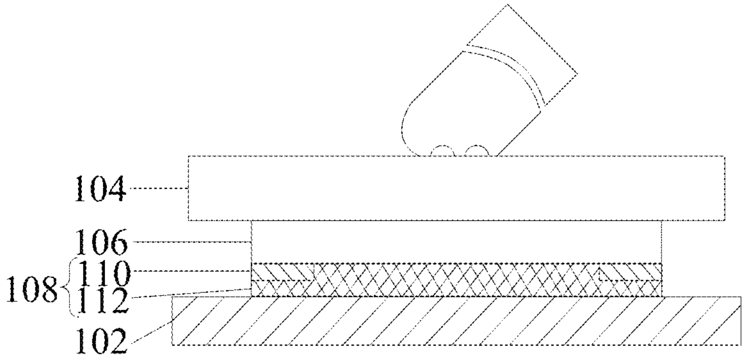
Figure 16:
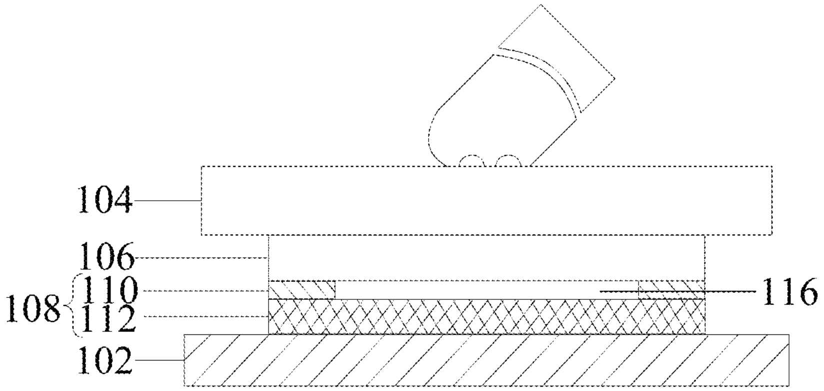
Figure 16A:
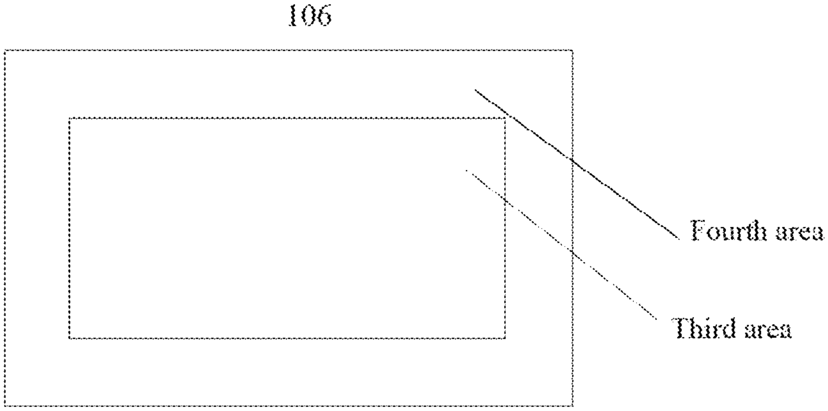
Figure 17:
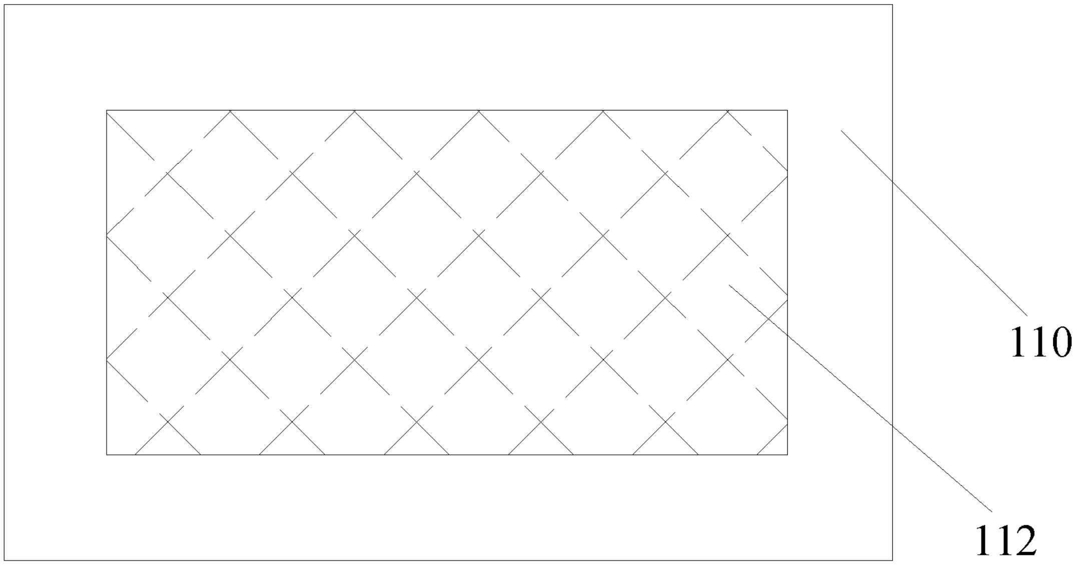
Figure 18:
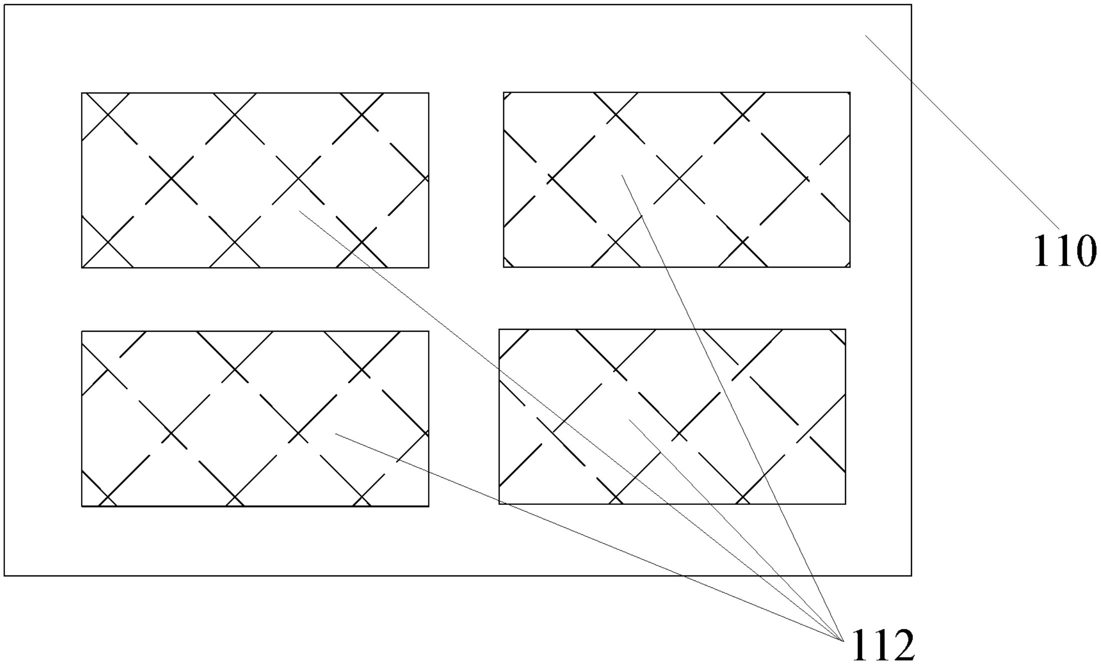
Figure 19:
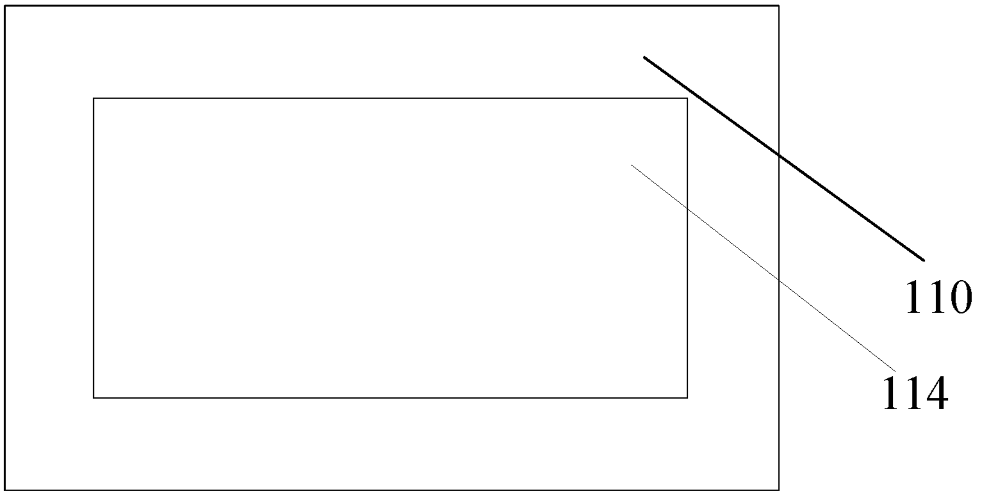
Figure 20:
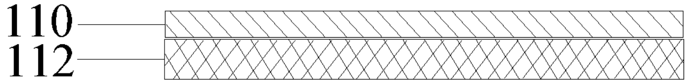
Figure 21:

FIG. 4 is a diagram of a structural model and a working principle of an ultrasonic fingerprint identification technology;

FIG. 5 is a first schematic diagram of a structure of an electronic device according to an embodiment of this application;

FIG. 6 is a second schematic diagram of a structure of an electronic device according to an embodiment of this application;

FIG. 7 is a third schematic diagram of a structure of an electronic device according to an embodiment of this application;

FIG. 8 is a first top view of a reflective support member in an electronic device according to an embodiment of this application;

FIG. 9 is a second top view of a reflective support member in an electronic device according to an embodiment of this application;

FIG. 10 is a third top view of a reflective support member in an electronic device according to an embodiment of this application;

FIG. 11 is a fourth top view of a reflective support member in an electronic device according to an embodiment of this application;

FIG. 12 is a fifth top view of a reflective support member in an electronic device according to an embodiment of this application;

FIG. 13 is a first side view of a reflective support member in an electronic device according to an embodiment of this application;

FIG. 14 is a second side view of a reflective support member in an electronic device according to an embodiment of this application;

FIG. 15 is a fourth schematic diagram of a structure of an electronic device according to an embodiment of this application;

FIG. 16 is a fifth schematic diagram of a structure of an electronic device according to an embodiment of this application;

FIG. 16A is a top view of an ultrasonic transducer of an electronic device according to an embodiment of this application;

FIG. 17 is a sixth top view of a reflective support member in an electronic device according to an embodiment of this application;

FIG. 18 is a seventh top view of a reflective support member in an electronic device according to an embodiment of this application;

FIG. 19 is an eighth top view of a reflective support member in an electronic device according to an embodiment of this application;

FIG. 20 is a third side view of a reflective support member in an electronic device according to an embodiment of this application; and FIG. 21 is a fourth side view of a reflective support member in an electronic device according to an embodiment of this application.

Reference numerals in FIG. 4 to FIG. 21:

102: Frame; 104: Foldable screen; 106: Ultrasonic transducer; 108: Reflective support member; 110: Adhesive; 112: Foam; 114: Hollow; 116: Air layer.

DETAILED DESCRIPTION

Technical solutions in embodiments of this application are clearly described below with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms such as "first" and "second" in this specification and claims of this application are used to distinguish between similar objects instead of describing a specific order or sequence. It should be understood that, data used in such a way is interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" indicates at least one of connected objects, and a character "/" generally indicates an "or" relationship between associated objects.

With reference to the accompanying drawings, an electronic device provided in the embodiments of this application is described below in detail by using specific examples and application scenarios thereof. In FIG. 4 and FIG. 5, TX1 indicates an ultrasonic wave emitted toward a fingerprint valley, and RX1 indicates a reflected ultrasonic wave of TX1. TX2 indicates an ultrasonic wave emitted toward a fingerprint ridge, and RX2 indicates a reflected ultrasonic wave of TX2. TX3 indicates an ultrasonic wave emitted toward a side of a frame 102, and RX3 indicates a reflected ultrasonic wave of TX3. Z1 indicates acoustic impedance of an ultrasonic transducer 106, Z2 indicates acoustic impedance of an air layer, and Z3 indicates acoustic impedance of a reflective support member 108. Dashed lines in FIG. 3 and FIG. 5 indicate deformation.

Before the technical solutions defined in this application are described, a structural model and a working principle of an ultrasonic fingerprint identification technology are first briefly described for ease of understanding of a to-be-resolved problem and a technical effect of this application.

Specifically, as shown in FIG. 4, a core component of a fingerprint identification module is the ultrasonic transducer 106, and the ultrasonic transducer 106 has two functions: one is to transmit ultrasonic waves under an effect of an external electric field, and the other is to pick up an ultrasonic signal that is reflected back and convert the ultrasonic signal into an electrical signal. The ultrasonic transducer is tightly attached to a back surface (a non-display surface) of a foldable screen 104 by using glue or double-sided tape (usually thin in thickness). "Tightly attached" means that there are no bubbles, voids, or foreign matter between attaching surfaces, or an impact of sizes and the number of bubbles, voids, or foreign matter on fingerprint identification performance is minimal and within an acceptable range.

In addition, there are at least two directions for ultrasonic waves transmitted by the ultrasonic transducer. In one direction, an ultrasonic wave is emitted toward the foldable screen 104, and may reach, after penetrating the foldable screen 104, a surface of a finger pressed on the foldable screen 104. In another direction, an ultrasonic wave is emitted away from the foldable screen 104, and this part of energy is to be recycled and reused. In order to recycle and reuse the ultrasonic wave emitted away from the foldable screen 104, a layer of gap is usually reserved on a back surface of the ultrasonic transducer to form an air gap. It is assumed that acoustic impedance of a material of the back surface of the ultrasonic transducer is Z1, and acoustic impedance of air is Z2. Because the material of the back surface of the ultrasonic transducer is usually a metal electrode material and an insulating protection coating, the acoustic impedance Z1 of the material of the back surface of the ultrasonic transducer is far greater than the acoustic impedance Z2 of the air. A reflection coefficient R1 of an interface between the ultrasonic transducer and the air gap may be estimated according to a reflection ratio calculation formula of the ultrasonic wave.

$$R1=(Z1-Z2)/(Z1+Z2)\approx Z1/(Z1+Z2)\approx Z1/Z1=1$$

It can be learned that, because of existence of the air gap, the ultrasonic wave TX3 emitted away from the foldable screen 104 is completely reflected on the interface of the air gap, and the reflected ultrasonic wave RX3 is emitted toward the foldable screen 104. In this way, efficiency of the ultrasonic transducer can be improved. This is the mechanism of recycling and reusing of the ultrasonic wave.

Further, as shown in FIG. 4, the ultrasonic wave TX1 and the ultrasonic wave TX2 that are emitted toward the foldable screen 104 reach the surface of the finger after penetrating the foldable screen 104. A part of the ultrasonic wave TX1 reaches the fingerprint valley (there is an air gap between the fingerprint valley and the foldable screen 104), and is completely reflected when meeting air, and energy of the reflected ultrasonic wave RX1 is relatively strong. A part of the ultrasonic wave TX2 reaches the fingerprint ridge and meets human tissue (whose acoustic impedance is greater than that of the air but less than that of the foldable screen 104) such as skin and muscle, a reflection ratio at the fingerprint ridge is less than that at the fingerprint valley, and energy of the reflected ultrasonic wave RX2 is weaker than that of RX1. The ultrasonic transducer picks up reflected ultrasonic waves, and may form a light-and-dark fingerprint pattern based on energy of ultrasonic waves at different locations.

It can be learned from the foregoing design solution that, the back surface of the ultrasonic transducer is suspended. When the foldable screen 104 is soft, a dent is likely to occur during fingerprint identification, causing damage to the foldable screen 104 and the ultrasonic transducer.

As shown in FIG. 5, an embodiment of this application provides an electronic device, including a frame 102, a foldable screen 104, an ultrasonic transducer 106, and a reflective support member 108. The foldable screen 104 is disposed above the frame 102, and there is a distance between the foldable screen 104 and the frame 102. The reflective support member 108 is disposed between the ultrasonic transducer 106 and the frame 102, and may be configured to support the ultrasonic transducer 106. In addition, the ultrasonic transducer 106 may transmit ultrasonic waves and receive reflected ultrasonic waves during use. In particular, most of ultrasonic waves transmitted by the ultrasonic transducer 106 are emitted toward the foldable screen 104, and a few are emitted toward the frame 102. An ultrasonic wave emitted toward the frame 102 is emitted toward the reflective support member 108 and completely reflected on an interface of the reflective support member 108, and then also emitted toward the foldable screen 104.

In particular, as shown in FIG. 5, in the electronic device provided in this application, the ultrasonic transducer 106 is disposed between the foldable screen 104 and the frame 102, and the ultrasonic transducer 106 is located at a bottom of the foldable screen 104, and is located on a non-display side of the foldable screen 104, to implement an under-display fingerprint identification technology of the electronic device with the foldable screen 104.

In addition, as shown in FIG. 5, the reflective support member 108 between the foldable screen 104 and the frame 102 may be configured to support the ultrasonic transducer

106. In this way, when external force is applied to the foldable screen 104, the reflective support member 108 can provide support for the ultrasonic transducer 106 to some extent, to prevent the foldable screen 104 and the ultrasonic transducer 106 from being broken and damaged due to excessively large mechanical deformation, thereby ensuring use security of the ultrasonic transducer 106 and the whole electronic device.

In addition, as shown in FIG. 5, the ultrasonic transducer 106 has high reflection performance. In this way, when being in contact with the ultrasonic transducer 106, an ultrasonic wave emitted toward the frame is completely reflected, and is emitted toward the foldable screen 104 after a traveling direction is changed. In this way, the ultrasonic wave transmitted by the ultrasonic transducer 106 toward the frame 102 can be recycled and reused, to improve working efficiency of the ultrasonic transducer 106 and improve accuracy of fingerprint identification.

Therefore, in this application, the reflective support member 108 is disposed between the ultrasonic transducer 106 and the frame 102, and the ultrasonic transducer 106 is supported and protected by the reflective support member 108. In addition, the ultrasonic wave transmitted by the ultrasonic transducer 106 toward the frame 102 is recycled and reused by using the reflective support member 108. In this way, the electronic device with the foldable screen 104 provided in this application can implement the under-display fingerprint identification technology, and a service life of the ultrasonic transducer 106 and the electronic device can be prolonged.

Specifically, as shown in FIG. 5, the ultrasonic transducer 106 may transmit ultrasonic waves to the frame 102 and the foldable screen 104 under an effect of an external electric field. In addition, the ultrasonic transducer 106 may pick up reflected ultrasonic waves and convert the reflected ultrasonic waves into electrical signals. The ultrasonic transducer 106 picks up the reflected ultrasonic waves, and may form a light-and-dark fingerprint pattern based on energy of ultrasonic waves at different locations, to implement fingerprint identification.

In a possible implementation, the foldable screen 104 includes a first area (not shown in the figure) and a second area (not shown in the figure). The first area is foldable and is used as a foldable area of the foldable screen 104, and the second area is not foldable and is used as a non-foldable area of the foldable screen 104. In particular, in the electronic device provided in this application, the ultrasonic transducer 106 is disposed between the second area and the frame 102.

Therefore, in this application, the ultrasonic transducer 106 is disposed in the non-foldable area of the foldable screen 104. In this way, in a process of using the electronic device, a user does not affect security of the ultrasonic transducer 106 when folding the foldable screen 104, and does not affect use of the ultrasonic transducer 106, thereby greatly improving use security of the ultrasonic transducer 106 and the whole electronic device.

In a possible implementation, as shown in FIG. 5, acoustic impedance of the reflective support member 108 is less than acoustic impedance of the ultrasonic transducer 106. In addition, the acoustic impedance of the reflective support member 108 is far less than the acoustic impedance of the ultrasonic transducer 106. Specifically, acoustic impedance of an interface, facing a side of the ultrasonic transducer 106, of the reflective support member 108 is far less than acoustic impedance of a material of a surface, facing a side of the reflective support member 108, of the ultrasonic transducer 106. In this way, compared with the acoustic impedance of the ultrasonic transducer 106, the acoustic impedance of the reflective support member 108 may even be ignored.

In this case, the ultrasonic wave transmitted by the ultrasonic transducer 106 toward the frame 102 may be completely reflected when meeting the reflective support member 108, so that maximal ultrasonic waves can be recycled and reused, to maximize utilization of ultrasonic waves, improve working efficiency of the ultrasonic transducer 106, and improve accuracy of fingerprint identification.

It should be noted that, as shown in FIG. 5, the interface, facing the side of the ultrasonic transducer 106, of the reflective support member 108 is smooth and flat, thereby ensuring evenness of the interface. Generally, sizes of surface pits or pores on the interface, facing the side of the ultrasonic transducer 106, of the reflective support member 108 are smaller than a pixel size of the ultrasonic transducer 106. In this way, even if reflected ultrasonic noise formed by the pits or the pores is picked up by the ultrasonic transducer 106, fingerprint image quality is not seriously affected. A person skilled in the art can understand the foregoing requirements, and details are not described herein.

In a possible implementation, as shown in FIG. 6 and FIG. 15, the ultrasonic transducer 106 is attached to the reflective support member 108, and the acoustic impedance of the reflective support member 108 is far less than the acoustic impedance of the ultrasonic transducer 106. In this way, the ultrasonic wave transmitted by the ultrasonic transducer 106 toward the frame 102 may be completely reflected when meeting the reflective support member 108, so that maximal ultrasonic waves can be recycled and reused.

In a possible implementation, as shown in FIG. 7 and FIG. 16, there is an air layer 116 between the ultrasonic transducer 106 and the reflective support member 108, and the acoustic impedance of the reflective support member 108 is far less than acoustic impedance of the air layer 116. In this way, the ultrasonic wave transmitted by the ultrasonic transducer 106 toward the frame 102 may be completely reflected when meeting the air layer 116, so that maximal ultrasonic waves can be recycled and reused.

Specifically, as shown in FIG. 7, the air layer 116 may exist between a whole area of the ultrasonic transducer 106 and the reflective support member 108. Alternatively, as shown in FIG. 16, the air layer 116 may exist between a local area of the ultrasonic transducer 106 and the reflective support member 108.

In a possible implementation, as shown in FIG. 5, the reflective support member 108 is an elastic layer, and has elasticity or flexibility. The elastic layer may be compressed when external force is applied, and the elastic layer may be completely or at least partially restored to a free state when the external force is withdrawn.

In a possible implementation, as shown in FIG. 6, a free-state thickness (that is, a natural thickness of the elastic layer in a case that there is no external force) of the elastic layer may be greater than or equal to a distance between the ultrasonic transducer 106 and the frame 102. That is, in a case that the electronic device is assembled completely and the user does not press the foldable screen 104, the reflective support member 108 can be always in contact with the ultrasonic transducer 106. In this way, consistency and stability of recycling and reusing of ultrasonic waves emitted away from the foldable screen 104 can be ensured.

In a possible implementation, as shown in FIG. 7, the free-state thickness (that is, the natural thickness of the elastic layer in the case that there is no external force) of the elastic layer may be less than the distance between the ultrasonic transducer 106 and the frame 102. That is, in a case that the user does not press the foldable screen 104 or the user presses with relatively weak force, the reflective support member 108 is separated from the ultrasonic transducer 106, and it is ensured that there is an air gap between the reflective support member 108 and the ultrasonic transducer 106. When the user presses with relatively strong force, the ultrasonic transducer 106 generates large mechanical deformation, and the ultrasonic transducer 106 is in close contact with the reflective support member 108.

In this way, a condition of total internal reflection is provided by air when finger pressing force is relatively weak, and a reflective interface is even and imaging quality is high. When finger pressing force is strong, a condition of total internal reflection is provided by the reflective support member 108. Although evenness is lower than that of the air, the reflective support member 108 can cushion mechanical deformation of the ultrasonic transducer 106, to avoid damage to the ultrasonic transducer 106.

Specifically, the free-state thickness is further explained as follows: In a case that the user does not press the foldable screen 104 or the user presses with relatively weak force, the foldable screen 104 does not squeeze the ultrasonic transducer 106 and the reflective support member 108, and in this state, a thickness of the reflective support member 108 is the foregoing free-state thickness. That is, the free-state thickness may be understood as a thickness in a natural state, that is, a thickness of the reflective support member 108 without deformation.

In a possible implementation, as shown in FIG. 15 and FIG. 16, the reflective support member 108 may be connected to the ultrasonic transducer 106. In this case, in a process of assembling the electronic device, the reflective support member 108 is first attached to a specified position of a back surface of the ultrasonic transducer 106, and then the foldable screen 104 and the ultrasonic transducer 106 are assembled to the frame 102. In particular, the reflective support member 108 is directly attached to the back surface of the ultrasonic transducer 106, and then is assembled to the frame 102, making assembly simpler.

Specifically, as shown in FIG. 15 and FIG. 16, the reflective support member 108 is tightly attached to the ultrasonic transducer 106. "Tightly attached" means that there are no bubbles, voids, or foreign matter between attaching surfaces of the reflective support member 108 and the ultrasonic transducer 106, or an impact of sizes and the number of bubbles, voids, or foreign matter on fingerprint identification performance is minimal and within an acceptable range.

In a possible implementation, as shown in FIG. 6 and FIG. 7, the reflective support member 108 may be connected to the frame 102. In this case, in a process of assembling the electronic device, the reflective support member 108 is first attached to a specified position of the frame 102, and then the foldable screen 104 and the ultrasonic transducer 106 are assembled to the frame 102. In particular, the reflective support member 108 is attached to the frame 102, helping the ultrasonic transducer 106 with recycling and reusing of ultrasonic waves emitted away from the foldable screen 104, and providing structural support for the foldable screen 104 and the ultrasonic transducer 106, thereby improving reliability of the electronic device.

Specifically, as shown in FIG. 6 and FIG. 7, the reflective support member 108 is tightly attached to the frame 102. "Tightly attached" means that there are no bubbles, voids, or foreign matter between attaching surfaces of the reflective support member 108 and the frame 102, or an impact of sizes and the number of bubbles, voids, or foreign matter on fingerprint identification performance is minimal and within an acceptable range.

In a possible implementation, as shown in FIG. 13, FIG. 14, FIG. 20, and FIG. 21, the reflective support member 108 includes an adhesive 110 and foam 112 that are connected to each other. The foam 112 may be connected to the ultrasonic transducer 106 through the adhesive 110, or may be connected to the frame 102 through the adhesive 110. Specifically, the adhesive 110 may be a silicone adhesive, a pressure-sensitive adhesive, or the like, to ensure that the foam 112 is stably connected to the ultrasonic transducer 106 or the frame 102. In addition, the foam 112 has good elasticity and plasticity. When the foldable screen 104 is pressed by a finger, mechanical deformation of the ultrasonic transducer 106 may be cushioned through deformation of the foam 112, to avoid damage to the ultrasonic transducer 106.

In a possible implementation as shown in FIG. 16A, the ultrasonic transducer 106 includes a third area and a fourth area. The third area may transmit and receive ultrasonic waves, and the third area is an effective working area of the ultrasonic transducer 106.

In a possible implementation, as shown in FIG. 8 and FIG. 17, the foam 112 may completely cover the third area, that is, the foam 112 completely covers the effective working area of the ultrasonic transducer 106. In this case, the foam 112 may be in contact with all positions of the third area, to ensure good consistency of transmitting efficiency of ultrasonic waves in the positions of the third area, and further ensure uniformity and consistency of fingerprint image quality.

In a possible implementation, as shown in FIG. 9, FIG. 10, FIG. 11, and FIG. 18, the foam 112 may partially cover the third area, that is, the foam 112 partially covers the effective working area of the ultrasonic transducer 106. In this case, a part, in contact with the third area, of the foam 112 may provide good mechanical support for the ultrasonic transducer 106, and a part, separated from the third area, of the foam 112 actually forms an air gap. The air gap provides a good condition of total internal reflection for ultrasonic waves emitted away from the foldable screen 104.

In a possible implementation, as shown in FIG. 12 and FIG. 19, the foam 112 may avoid the third area, that is, the foam 112 avoids the effective working area of the ultrasonic transducer 106. In this case, an air gap may provide a good condition of total internal reflection for ultrasonic waves emitted away from the foldable screen 104.

In a possible implementation, when the foam 112 partially covers the third area, a hollow 114 is provided on the foam 112, and the hollow 114 covers the third area.

Specifically, as shown in FIG. 9 and FIG. 18, the foam 112 may be designed as a grid shape. Cross-shaped foam 112 in the middle provides mechanical support for a central area of the third area, and surrounding hollows 114 actually form air gaps.

In addition, as shown in FIG. 10 and FIG. 11, the foam 112 may be in another shape, for example, the hollow 114 in the middle may be an octagon, a circle, or even in an irregular shape. These two shapes can provide better mechanical support for four corners of the third area. Generally, a contact area between the finger and the foldable screen 104 is approximately circular or oval, and the four corners of the third area provide no useful image. Therefore, contact of the foam 112 with the four corners has no significantly negative impact on fingerprint image quality.

In a possible implementation, as shown in FIG. 17, FIG. 18, and FIG. 19, when the reflective support member 108 is connected to the ultrasonic transducer 106, the adhesive 110 is at least connected to the fourth area, so that the adhesive 110 is connected to a non-effective working area of the ultrasonic transducer 106. A hollow 114 is provided on the adhesive 110, so that the adhesive 110 does not affect total internal reflection of ultrasonic waves transmitted by the ultrasonic transducer 106 toward the frame 102. In addition, the foam 112 may be in direct contact with the third area of the ultrasonic transducer 106, or a gap may be reserved between the foam 112 and the third area of the ultrasonic transducer 106.

In a possible implementation, an attaching surface, facing a side of the frame 102, of the foldable screen 104 is a metal surface. In this way, the metal surface can ensure that the foldable screen 104 has good strength, thereby ensuring a service life of the foldable screen 104. In addition, an ultrasonic wave may travel through metal, so that the metal screen does not affect working of the ultrasonic transducer 106. Specifically, the attaching surface, facing the side of the frame 102, of the foldable screen 104 may be a steel sheet, an alloy sheet, or the like.

In a possible implementation, the frame 102 is a middle frame. That is, the ultrasonic transducer 106 is disposed between the middle frame and the foldable screen 104.

In a related technology, as shown in FIG. 1 and FIG. 2, an ultrasonic transducer 106' is mainly disposed on a side of an electronic device with a foldable screen 104', to implement a fingerprint identification function. However, appearance of the side is greatly damaged by the ultrasonic transducer 106', and appearance appeal is far lower than that of an electronic device applying an under-display fingerprint identification technology. Specifically, there are two main factors that limit application of the under-display fingerprint identification technology to the electronic device with the foldable screen 104'.

A first factor is as follows: As shown in FIG. 3, the foldable screen 104' used in the electronic device is soft, and a metal support mesh 108' is needed to support and protect a back surface of the foldable screen 104'. An optical fingerprint identification technology cannot work through a metal layer.

A second factor is as follows: As shown in FIG. 3, when an ultrasonic fingerprint identification technology is used, a sound wave transducer of the ultrasonic transducer 106' needs to be directly attached to the back surface of the foldable screen 104'. The foldable screen 104' is soft and prone to deformation, and cannot provide enough mechanical protection for the sound wave transducer. When the user performs unlocking, the foldable screen 104' and the ultrasonic transducer 106' are deformed, and when mechanical deformation of the ultrasonic transducer 106' is excessively large, the ultrasonic transducer 106' is broken because the deformation exceeds a limit or the ultrasonic transducer 106' collides with a structural member such as a frame 102'.

Therefore, as shown in FIG. 5, this application provides an electronic device with a foldable screen 104, to which an under-display fingerprint identification technology can be applied. Specifically, an ultrasonic transducer 106 is disposed on a back surface of the foldable screen 104 of the electronic device, and the ultrasonic transducer 106 is tightly attached to the foldable screen 104 by using a material such as glue or tape. The ultrasonic transducer 106 is located in a non-foldable area of the foldable screen 104, and the ultrasonic transducer 106 is located between the foldable screen 104 and a frame 102. There is a reflective support member 108 between the ultrasonic transducer and the frame 102, and the reflective support member 108 reflects an ultrasonic wave transmitted by a back surface of the ultrasonic transducer 106, and provides structural support for the ultrasonic transducer 106 and the foldable screen 104 to avoid excessively large deformation.

Specifically, as shown in FIG. 5, in the electronic device provided in this embodiment of this application, the ultrasonic transducer 106 is tightly attached to the back surface (a non-display surface) of the foldable screen 104 by using glue or double-sided tape (usually thin in thickness and not shown in the figure) in the non-foldable area of the foldable screen 104. The attaching surface of the foldable screen 104 may be a metal layer such as a steel sheet or an alloy, because an ultrasonic wave may travel through metal.

In addition, as shown in FIG. 5, the ultrasonic transducer 106 is located between the foldable screen 104 and the frame 102, and the reflective support member 108 is disposed between the ultrasonic transducer 106 and the frame 102. The reflective support member 108 may be in close contact with at least one of the ultrasonic transducer 106 and the frame 102. Acoustic impedance Z3 of a surface, in contact with the ultrasonic transducer 106, of the reflective support member 108 needs to be far less than acoustic impedance Z1 of a material of the back surface of the ultrasonic transducer 106, that is, $Z3 \ll Z1$. An objective of this design is to implement total internal reflection of an ultrasonic wave on a contact interface between the ultrasonic transducer 106 and the reflective support member 108, thereby implementing recycling and reusing of ultrasonic waves emitted away from the foldable screen 104.

In addition, the surface, in contact with the ultrasonic transducer 106, of the reflective support member 108 needs to be smooth and flat, to ensure evenness of the interface. Generally, sizes of pits or pores on the surface, in contact with the ultrasonic transducer 106, of the reflective support member 108 need to be smaller than a pixel size of the ultrasonic transducer 106. In this way, even if reflected ultrasonic noise formed by the pits or the pores is picked up by the ultrasonic transducer 106, fingerprint image quality is not seriously affected.

In addition, as shown in FIG. 5, the reflective support member 108 further has flexibility or elasticity, and may be compressed when external force is applied, and may be completely or at least partially restored to a free state when the external force is withdrawn. In particular, because the reflective support member 108 is disposed between the ultrasonic transducer 106 and the frame 102, when the foldable screen 104 is pressed by a finger during fingerprint identification, the reflective support member 108 can provide structural support to some extent, to prevent the foldable screen 104 and the ultrasonic transducer 106 from being broken and damaged due to excessively large mechanical deformation. In addition, even if the ultrasonic transducer 106 generates excessively large mechanical deformation, the ultrasonic transducer 106 is not directly hit the hard frame 102 to be broken, because the reflective support member 108 is soft enough to cushion such hit.

The technical solutions defined in this application are further described below by using two specific embodiments.

As shown in FIG. 6 and FIG. 7, in a first specific embodiment, the reflective support member 108 includes a two-layer structure. A layer close to the ultrasonic transducer 106 is foam 112, and a layer close to the frame 102 is an adhesive 110 (for example, a silicone adhesive or a pressure-sensitive adhesive). The foam 112 is attached to the frame 102 by using the adhesive 110. During assembly, the reflective support member 108 is first attached to a specified position of the frame 102, and then the foldable screen 104 and the ultrasonic transducer 106 are assembled.

In this embodiment, as shown in FIG. 6, a free-state thickness of the reflective support member 108 may be not less than a gap between the ultrasonic transducer 106 and the frame 102, to ensure that the foam 112 of the reflective support member 108 can be always in contact with the ultrasonic transducer 106 after assembly is completed. In addition, as shown in FIG. 7, the free-state thickness of the reflective support member 108 may be less than the gap between the ultrasonic transducer 106 and the frame 102. When no finger is pressed or pressing force is relatively weak, an air gap is still reserved between the ultrasonic transducer 106 and the reflective support member 108. When finger pressing force is relatively strong, the ultrasonic transducer 106 generates relatively large mechanical deformation, and the ultrasonic transducer 106 is in close contact with the reflective support member 108.

In this embodiment, as shown in FIG. 8, the foam 112 may completely cover an effective working area of the ultrasonic transducer 106. Alternatively, as shown in FIG. 9, FIG. 10, and FIG. 11, the foam 112 may partially cover the effective working area of the ultrasonic transducer 106. Alternatively, as shown in FIG. 12, the foam 112 may not cover the effective working area of the ultrasonic transducer 106.

In this embodiment, the reflective support member 108 is attached to the frame 102, helping the ultrasonic transducer 106 with recycling and reusing of ultrasonic waves emitted away from the foldable screen 104, and providing structural support for the foldable screen 104 and the ultrasonic transducer 106, thereby improving reliability of the electronic device.

As shown in FIG. 15 and FIG. 16, in a second specific embodiment, the reflective support member 108 includes a two-layer structure. A layer close to the ultrasonic transducer 106 is an adhesive 110 (for example, a silicone adhesive or a pressure-sensitive adhesive), and a layer close to a middle frame is foam 112. The adhesive 110 has a hollow 114 in an effective working area of the ultrasonic transducer 106, and the foam 112 does not necessarily have a hollow 114 in the effective working area. The foam 112 is attached to the back surface of the ultrasonic transducer 106 by using the adhesive 110. During assembly, the reflective support member 108 is first attached to a specified position of the back surface of the ultrasonic transducer 106, and then the foldable screen 104 and the ultrasonic transducer 106 are assembled to the middle frame.

In this embodiment, as shown in FIG. 15 and FIG. 16, the reflective support member 108 includes the two-layer structure. The layer close to the ultrasonic transducer 106 is the adhesive 110 (for example, the silicone adhesive or the pressure-sensitive adhesive), and the layer close to the frame 102 is the foam 112. The adhesive 110 has the hollow 114 in the effective working area of the ultrasonic transducer 106, and the foam 112 does not necessarily have a hollow 114 in the effective working area of the ultrasonic transducer 106. The foam 112 is attached to the back surface of the ultrasonic transducer by using the adhesive 110. During assembly, the reflective support member 108 is first attached to the specified position of the back surface of the ultrasonic transducer, and then the foldable screen 104 and the ultrasonic transducer are assembled to the frame 102.

In this embodiment, as shown in FIG. 17, the foam 112 may completely cover the effective working area of the ultrasonic transducer 106. Alternatively, as shown in FIG. 18, the foam 112 may partially cover the effective working area of the ultrasonic transducer 106. Alternatively, as shown in FIG. 19, the foam 112 may not cover the effective working area of the ultrasonic transducer 106.

In this embodiment, the reflective support member 108 is directly attached to the back surface of the ultrasonic transducer 106, and then is assembled to the frame 102, making assembly simpler.

In the description of this specification, the description with reference to the terms such as "an embodiment", "some embodiments", "an illustrative embodiment", "an example", "a specific example", or "some examples" means that a specific feature, a structure, a material, or a characteristic described with reference to the embodiment or example is included in at least one embodiment or example of this application. In this specification, the foregoing example expressions of the terms are not necessarily with respect to a same embodiment or example. In addition, the described specific features, structures, materials, or characteristics may be combined in a proper manner in any one or more of the embodiments or examples.

Although the embodiments of this application have been illustrated and described, a person of ordinary skill in the art can understand that various changes, modifications, replacements, and variants may be made to these embodiments without departing from the principle and purpose of this application, and the scope of this application is limited by the claims and their equivalents.

What is claimed is:

1. An electronic device, comprising:

a frame;

a foldable screen, disposed above the frame;

an ultrasonic transducer, disposed between the frame and the foldable screen, and configured to transmit and receive ultrasonic waves; and a reflective support member, disposed between the ultrasonic transducer and the frame, and configured to support the ultrasonic transducer, wherein at least some of ultrasonic waves emitted toward the frame are completely reflected by the reflective support member and then are emitted toward the foldable screen, wherein the reflective support member is connected to the ultrasonic transducer; or the reflective support member is connected to the frame, wherein the reflective support member comprises an adhesive and foam that are connected to each other; and the foam is connected to the ultrasonic transducer or the frame through the adhesive, wherein the ultrasonic transducer comprises a third area and a fourth area, and the third area is configured to transmit ultrasonic waves; and the foam completely covers the third area, or partially covers the third area, or avoids the third area, wherein when the foam completely or partially covers the third area, a hollow is provided on the foam, and the hollow covers the third area, wherein when the reflective support member is connected to the ultrasonic transducer, a hollow is provided on the adhesive, and the foam is in contact with or separated from the third area, wherein the fourth area is configured to be ultrasonic non-transmitting, wherein the adhesive is connected to the fourth area, wherein the foam is shaped to provide mechanical support for a central area and a corner area of the third area; wherein the reflective support member is an elastic layer; and a free-state thickness of the elastic layer is less than a distance between the ultrasonic transducer and the frame.

2. The electronic device according to claim 1, wherein the foldable screen comprises a first area and a second area, and the first area is foldable; and the ultrasonic transducer is located between the second area and the frame.

3. The electronic device according to claim 1, wherein the acoustic impedance of the reflective support member is less than the acoustic impedance of the ultrasonic transducer.

4. The electronic device according to claim 1, wherein the ultrasonic transducer is attached to the reflective support member; or an air layer exists between the ultrasonic transducer and the reflective support member.

5. The electronic device according to claim 1, wherein an attaching surface, facing a side of the frame, of the foldable screen is a metal surface.

* * * * *